Sept. 27, 1966  R. N. BRUNGER  3,275,816
LAMP ASSEMBLY FOR MOTOR VEHICLES
Filed Feb. 25, 1964
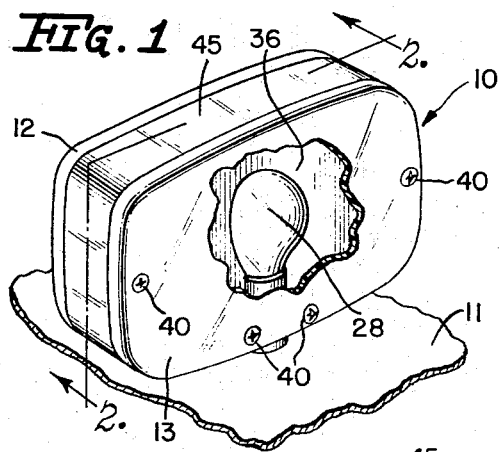
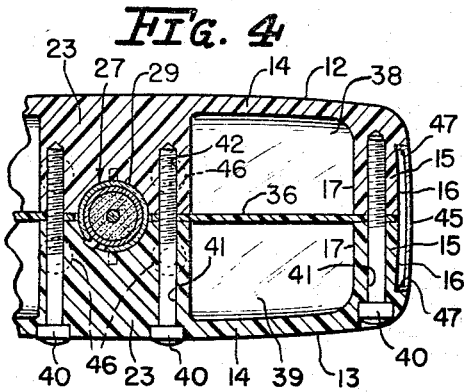
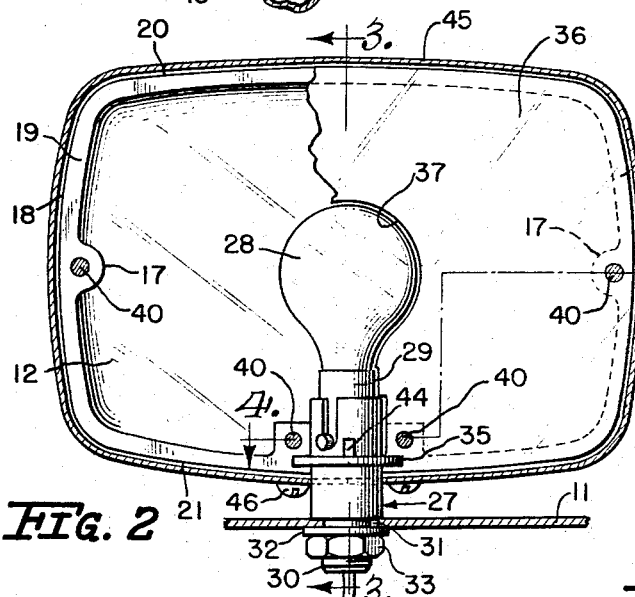
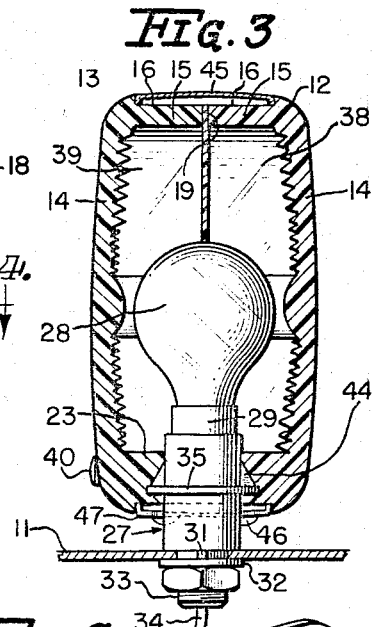
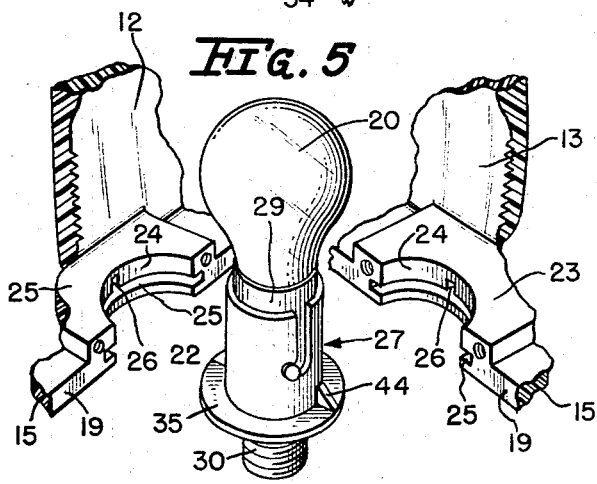
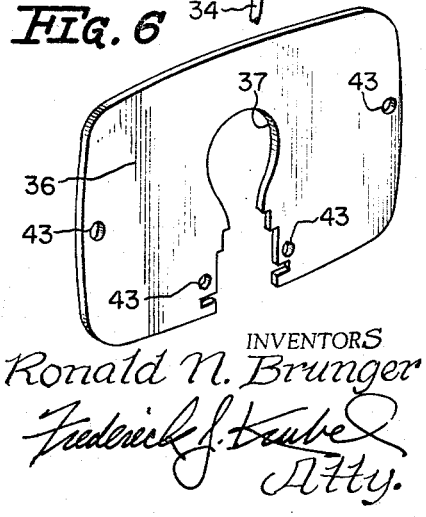
INVENTORS
Ronald N. Brunger
Frederick J. Knube
Atty.

United States Patent Office 3,275,816
Patented Sept. 27, 1966

3,275,816
LAMP ASSEMBLY FOR MOTOR VEHICLES
Ronald N. Brunger, Fort Wayne, Ind., assignor to International Harvester Company, Chicago, Ill., a corporation of New Jersey
Filed Feb. 25, 1964, Ser. No. 347,137
16 Claims. (Cl. 240—8.22)

This invention relates to lamp assemblies for motor vehicles and more particularly to a new and improved directional signal lamp assembly for motor trucks.

One of the primary objectives of the present invention is to provide a double aspect signal or marker lamp of improved and simplified construction which is capable of affording direction signal indications both forwardly and rearwardly of a motor vehicle such as a motor truck. Heretofore vehicle directional signal lamps of the double aspect type wherein the direction signal indications are visible from points forwardly as well as rearwardly of the vehicle when used in conjunction with motor trucks where mounted on top of the truck front fenders and essentially comprised a pair of individual lamp units which were embodied in a single lamp housing or casing for convenience. Consequently the construction of prior directional signal lamps of the double aspect type generally involve the costly duplication of many parts such as lamp sockets, lamp bulbs, reflectors, gaskets and the like. Obviously the resulting vehicle signal lamp was not only expensive to manufacture and assemble, but also was bulky and unattractive in appearance. It is therefore an important object of the present invention to obviate the shortcomings noted above of prior directional signal lamps by providing a novel double aspect directional signal lamp construction wherein duplication of parts is substantially eliminated and wherein certain parts and components are common to both aspects of the lamp.

A more specific object of the present invention is to provide a double aspect directional signal lamp construction for a motor truck wherein a single baffle element serves as sealing gaskets and light reflectors for the two lenses, to thereby simplify the construction of and reduce the manufacturing cost of the vehicle directional signal lamp.

A still further object is to provide a compact, double aspect vehicle directional signal lamp construction wherein a single lamp socket and lamp bulb is employed for illuminating both aspects.

A still further object is to substantially reduce the overall size and manufacturing cost of vehicle signal lamps of the double lens type by forming the lenses in such a manner that when assembled together the need for a separate housing or casing is eliminated.

A more specific object is to provide a lamp construction which includes a pair of identical lenses with a combination gasket and light reflector interposed between the lenses which are arranged back-to-back, the lenses being formed to support a single lamp socket, and a split band for concealing the joint between the lenses and for clearly defining the front and rear aspects of the lamp.

The foregoing and other important objects and desirable features inherent in and encompassed by the invention together with many of the purposes and uses thereof will become readily apparent from a reading of the ensuing description in conjunction with the annexed drawings in which:

FIGURE 1 is a perspective view of a vehicle directional signal lamp embodying the invention; a portion of the lamp is cut away to better illustrate the invention;

FIGURE 2 is a vertical sectional view taken substantially along line 2—2 of FIGURE 1, a portion thereof is broken away to better illustrate the construction;

FIGURE 3 is a vertical sectional view taken substantially along line 3—3 of FIGURE 2;

FIGURE 4 is a horizontal sectional view taken substantially along line 4—4 of FIGURE 2;

FIGURE 5 is an enlarged, perspective view of the lamp bulb supporting member and fragmentary portions of the lenses; and FIGURE 6 is a perspective view of the combination gasket and light reflector element.

Referring to the drawing wherein like reference characters represent like elements throughout the various views. Referring to the drawing in detail, wherein like reference characters represent like elements throughout the various views, a motor vehicle directional signal lamp designated generally by numeral 10 and embodying the invention is shown. The directional signal lamp 10 is of the double aspect type so that the directional signal is visible both forwardly and rearwardly of the motor vehicle when mounted on the uppermost surface of the front fender 11 partially shown of a motor vehicle such as a motor truck or the like, not shown. It is to be understood, however, that the directional signal lamp 10 could be mounted on other parts of the motor vehicle without departing from the spirit and scope of the invention. The motor vehicle directional lamp 10 being of the double aspect type includes a pair of translucent plastic or glass lenses 12 and 13, preferably the lens 12 which faces forwardly when the signal lamp 10 is mounted on the motor vehicle is clear or amber colored and the rearwardly facing lens 13 is colored red. While the invention is primarily concerned with the construction of a double aspect signal lamp, it is to be understood that the same construction could be employed for a single aspect lamp by merely making the rear lens 13 opaque, if it is not desired for a light to show in opposite directions from the signal lamp 10.

The lenses 12 and 13 are identical in construction with the exception of the color thereof as pointed out above. The lenses 12 and 13 are generally cup-shaped and each includes a substantially flat generally rectangularly-shaped light-transmitting wall 14. A projecting flange 15, integrally formed with and extending axially from the peripheral edge of the light-transmitting wall 14, is provided. As best illustrated in FIGURES 3 and 4, the outermost surface 16 of the flange 15 is slightly undercut for a purpose which will be pointed out hereinafter. Each lens 12, 13 is also provided with a pair of enlarged bosses 17 which are formed on the interior of the normally vertical side sections 18 of the flange 15. The bosses 17 extend from the interior surface of the light-transmitting wall 14 to the marginal edge 19 of the flange 15 and are vertically spaced substantially midway between the uppermost and lowermost horizontal sections 20, 21, respectively of the flange 15. It is to be understood that while the lenses 12 and 13 illustarted have light-transmitting walls 14 which are shaped generally rectangular in end elevation, the light-transmitting walls 14 could have a circular or other shape without departing from the spirit and scope of the invention.

The lowermost flange section 21 of each lens 12, 13 is provided with a central integrally formed raised or thickened portion 23 which is provided with a semi-circular notch or recess defined by a generally semi-cylindrical surface 24. A semi-circular substantially U-shaped groove 25 is formed in the semi-cylindrical surface 24. The semi-cylindrical surfaces 24 are each also provided with a triangularly shaped recess 26 which opens into a respective groove 25 and is circumferentially spaced substantially midway between the ends of the respective semi-cylindrical surface 24.

The means for mountinng the signal lamp 10 on the fender 11 or other vehicle supporting surface includes a generally cylindrical lamp supporting member 27 having a lamp socket portion which is adapted to receive a lamp bulb 28 having bayonet-type base 29, as is commonly provided on vehicle type lamp bulbs. One end of the lamp supporting member 27 is provided with a reduced-diameter threaded nipple or hollow-bolt 30. A locating lug 31, integrally formed with the nipple 30, projects from the nipple 30 at the shoulder formed by the juncture of the lamp portion of the supporting member 27 and the nipple 30. The threaded nipple 30 is adapted to be inserted through an aperture in the fender 11 or other vehicle supporting surface with the lug 31 disposed within a relatively small notch also formed in the supporting surface whereby the lamp supporting member 27 can be secured in position by a washer 32 clamped in place by a nut 33 threaded on the nipple 30. The lug 31 cooperates with the notch to correctly position the signal lamp 10 on the fender 11 so that the lens 12 faces forwardly of the vehicle and the lens 13 faces rearwardly and further prevents the signal lamp 10 from being inadvertently turned or moved with respect to the fender 11. An insulated conductor or wire 34 extends through the nipple 30 and is electrically connected to one terminal (not shown) of the lamp supporting member 27 and the opposite end of the wire 34 is electrically connected to the suitable circuit controlling means (not shown). The other terminal (not shown) of the lamp supporting member 27 is grounded as is customary. As best shown in FIGURE 5, the lamp supporting member 27 is provided with a radially outwardly extending, annular flange 35 intermediate its ends. The flange 35 has a radial length substantially equal to the radial depth of the grooves 25 and has substantially the same thickness as the height of the grooves 25. It is to be also understood that the radius of curvature of the semi-cylindrical surface 24 is substantially the same as the radius of curvature of the outer surface lamp socket portion of the lamp supporting member 27.

The invention contemplates the utilization of a single member 36 which functions as a light reflector for both of the lenses 12 and 13 and also serves as gasket means for sealing the joint between the lenses 12, 13 in a water and dust-tight manner. The light reflector 36 is preferably light in color or coated with a light colored covering of paint or the like and is made of a conventional gasket material such as cork, rubber, rubber-impregnated cardboard or heat-resistant plastic so as to be resiliently compressible. The light reflector 36 is relatively thin and plate-like in appearance. When the lenses 12 and 13 are in their assembled relationship, the light reflector 36 is sandwiched therebetween and marginal edges 19 of the flanges 15 are in abutting engagement with the peripheral edge portion of the light reflector 36, as best illustrated in FIGURES 3 and 4. The light reflector 36 is provided with a cut-out, indicated by reference character 37, which extends from the normally lowermost edge thereof to accommodate the lamp supporting member 27 and the lamp bulb 28. The manner in which the light reflector 36 is compressed between and secured to the lenses 12 and 13 will be pointed out hereinafter. However, it is to be understood that when all of the components of the motor vehicle directional signal lamp 10 are in their assembled relationship, the light reflector 36, in effect, divides the interior space defined by the lenses 12 and 13 into two substantially identical lamp compartments 38, 39 and since the longitudinal axis of the lamp supporting member 27 and the lamp socket portion thereof lies in the plane of the light reflector 36, the single lamp bulb 28 received in the socket portion is capable of illuminating both lamp compartments 38, 39. This double aspect characteristic of the motor vehicle directional signal lamp 10 is best illustrated in FIGURE 3.

The lenses 12, 13 are secured together and compressed into abutting engagement with the light reflector 36 by means of four axially extending bolts 40 which extend through poles 41 in the bosses 17 and thickened portion 23 of the lens 13 and are threaded into recesses 42 formed in the bosses 17 and thickened portion 23 of the lens 12 as best illustrated in FIGURE 4. It will be appreciated that the light reflector 36 is provided with apertures 43 which are registerable with the aligned poles 41 and recesses 42 to permit passage of the bolts 40 therethrough. From the foregoing it is believed the assembly of the directional signal lamp 10 is clear. The lamp supporting member 27 with a lamp bulb 28 disposed within the socket portion thereof is illustrated in FIGURE 5 is mounted on the lens 12 by inserting substantially one-half of the annular flange 35 into the U-shaped groove 25 of the lens 12 with one of a pair of triangularly shaped lugs 44 seated in the recess 26. The lugs 44 are circumferentially spaced substantially 183 degrees apart and are integrally formed with and are disposed at the juncture of the radial flange 35 and the socket portion of the lamp supporting member 27. Thereafter the light reflector 36 is positioned on the marginal edge 19 of the lens 12 with the apertures 43 in registration with the threaded recesses 42. Lens 13 is then placed on the exposed surface of the light reflector 36 with the radial flange 35 disposed within the U-shaped groove 25 of the lens 13. When in this position one of the lugs 44 projects into the triangularly shaped recess 26 of the lens 13 and the openings 41 are in registration with the apertures 43 of the light reflector 36. It will be appreciated that tightening of the bolts 40 causes the marginal edges 19 of the lenses 12, 13 to be firmly pressed into abutting engagement with the peripheral edge portion of the light reflector 36 and inasmuch as the light reflector 36 is made of gasket material a substantially water and dust-tight seal is provided between the lenses 12 and 13. It will also be appreciated that as the bolts 40 are drawn up tightly the cylindrical socket portion of the lamp supporting member 27 is firmly clamped by the semi-sylindrical surfaces 24. The radial flange 35 and lug 44 cooperate with the U-shaped grooves 25 and the recesses 26 respectively to positively and immovably connect the lamp supporting member 27 to the lens 12, 13.

In order to improve the decorative appearance of the vehicle directional signal lamp 10 and to eliminate the possibility of light rays being emitted from the lamp compartments 38, 39 through the axially extending flanges 15 thereof a band 45 made of extruded aluminum or chrome plated roll section steel or the like substantially encircles the flanges 15 as illustrated in FIGURE 2. As shown in FIGURES 3 and 4 the band 45 engages the outermost surfaces 16 of the flanges 15 and the free ends thereof are secured to the thickened portions 23 of the lenses 12, 13 by means of a pair of capscrews 46. It will be appreciated that the band 45 has an axial rib sufficient to extend between the shoulders 47 formed by the outermost surfaces 16 of the flanges 15 and the light-transmitting walls 14. Thus inasmuch as the band 45 is made of an opaque material the light rays emitted by the lamp bulb 28 can only pass through the light-transmitting walls 14 of the lenses 12, 13. Furthermore, since the outermost surfaces 26 are undercut or radially disposed inwardly of the outer marginal edges of the light-transmitting walls 14 which outermost surfaces 16 and the shoulder 17 define a pocket or seat for the band 45 the exposed surface of the band 45 appears to merge with the light-transmitting walls 14 to enhance the overall decorative appearance of the vehicle signal lamp 10.

The embodiment of the invention chosen for the purposes of illustration and description herein is that preferred for achieving the objects of the invention and developing the utility thereof in a most desirable manner, due regard being had to existing factors of economy, simplicity of design and construction, production methods and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. An automotive vehicle signal lamp construction comprising, in combination, generally plate-like light reflector means; a pair of substantially identical lenses arranged back-to-back, each lens being in abutting engagement with a peripheral edge portion of the said light reflector means, said light reflector means dividing the interior space defined by said lenses into two compartments; and a single lamp supporting member having a generally cylindrical shape carried by integrally formed portions of said lenses with the longitudinal axis thereof lying substantially in the plane of said light reflector means and having a socket disposed within both of said compartments adapted to receive a lamp bulb.

2. An automotive signal lamp construction as set forth in claim 1, including a band substantially encircling and secured to said lenses, said band overlying and covering the joints between said lenses and said light reflector means.

3. An automotive vehicle signal lamp construction comprising, in combination, a substantially flat, plate-like light reflector; a pair of substantially identical lenses arranged back-to-back, each lens being in abutting engagement with a respective opposite side of a peripheral edge portion of said light reflector, said light reflector dividing the interior space defined by said lenses into two compartments; and a single lamp supporting member having a generally cylindrical shape carried by integrally formed portions of said lenses with the longitudinal axis thereof lying substantially in the plane of said light reflector and having a socket disposed within both of said compartments adapted to receive a single lamp bulb.

4. An automotive vehicle signal lamp construction as set forth in claim 3, wherein each of said lenses has a peripheral portion pressed into abutting engagement with a respective opposite side of said peripheral edge portion of said light reflector and said light reflector is made of a resiliently compressible material whereby said light reflector also serves as a gasket for sealing the joint between said lenses.

5. An automotive vehicle signal lamp construction as set forth in claim 3, including a band substantially encircling and secured to said lenses, said band overlying and covering the joints between said lenses and said light reflector.

6. An automotive vehicle signal lamp construction comprising, in combination, a substantially flat, plate-like light reflector; a pair of substantially identical, generally cup-shaped lenses arranged back-to-back, each lens having a peripheral edge thereof in abutting engagement with a respective opposite side of said light reflector, said light reflector dividing the interior space defined by said lenses into two compartments; a single lamp supporting member having a generally cylindrical shape carried by integrally formed portions of said lenses with the longitudinal axis thereof lying substantially in the plane of said light reflector and having a cylindrical lamp bulb socket disposed within both of said compartments adapted to receive a single lamp bulb; fastening means for securing said lenses together and for clamping said lamp bulb supporting member between said integrally formed portions of said lenses; and a band substantially encircling and secured to said lenses, said band overlying and covering the joints between said peripheral edges of said lenses and said light reflector.

7. An automotive vehicle signal lamp construction as set forth in claim 6, wherein said light reflector is made of a resiliently compressible material whereby said light reflector also serves as a gasket for sealing the joints between said lenses and said light reflector.

8. An automotive vehicle signal lamp construction as set forth in claim 7, wherein said lamp supporting member has a mounting portion projecting exteriorly of said lenses adapted to be secured to a vehicle part so as to support the vehicle signal lamp on a vehicle.

9. An automotive vehicle signal lamp construction comprising, in combination, a substantially flat, plate-like light reflector; a pair of substantially identical lenses arranged back-to-back, each lens being formed to provide a light-transmitting wall and a peripheral flange extending axially away from said light-transmitting wall, the free edge surface portion of each of said flanges being in abutting engagement with a respective opposite side of a peripheral edge portion of said light reflector, said light reflector dividing the interior space defined by said lenses into two compartments; a single lamp supporting member having a generally cylindrical shape carried by integrally formed portions of said lenses with the longitudinal axis thereof lying substantially in the plane of said light reflector and having a cylindrical bulb socket disposed within both of said lamp compartments adapted to receive a single lamp bulb; fastening means for firmly pressing the said free edge surface portion of each of said flanges into abutting engagement with said light reflector and for clamping said lamp supporting member between said integrally formed portions of said lenses; and a band substantially encircling and secured to said lens flanges, said band being disposed on the outermost surfaces of said lens flanges and covering the joints between said free edge surface portions of said lens flanges and said light reflector.

10. An automotive vehicle signal lamp construction as set forth in claim 9, wherein said light reflector is made of a resiliently compressible material whereby said light reflector serves as a gasket for sealing the joint between said lenses.

11. An automotive vehicle signal lamp construction comprising, in combination, a substantially flat, plate-like light reflector; a pair of substantially identical lenses arranged back-to-back, each lens being formed to provide a light-transmitting wall and a peripheral flange extending axially away from said light-transmitting wall, the free edge surface portion of each of said flanges being in abutting engagement with a respective opposite side of a peripheral edge portion of said light reflector, said light reflector dividing the interior space defined by said lenses into two compartments, each of said lens flanges having a semi-cylindrical recess formed therein defined by a semi-cylindrical surface, said recesses being axially registerable; a lamp supporting member having a generally cylindrical shape carried by said lenses with the longitudinal axis thereof lying substantially in the plane of light reflector and having a cylindrical lamp bulb socket disposed within both of said compartments adapted to receive a single lamp bulb for illuminating both lamp compartments, said cylindrical lamp bulb socket being engaged by said semi-cylindrical surfaces of said recesses; fastening means for firmly pressing said free edge surface portion of each of said flanges into abutting engagement with said light reflector and for clamping said cylindrical lamp bulb socket between said semi-cylindrical surfaces; and an opaque band substantially encircling and secured to said lens flanges, said band being disposed on the outermost surfaces of said lens flanges and covering the joints between said free edge surface portions of said lens flanges and said light reflector.

12. An automotive vehicle signal lamp construction as set forth in claim 11, wherein said lamp supporting member has an externally threaded nipple projecting exteriorly of said flanges adapted to be secured to a vehicle part so as to support the vehicle signal lamp on a vehicle.

13. An automotive vehicle signal lamp construction comprising, in combination, a substantially flat, plate-like combination light reflector and gasket member, said combination light reflector and gasket member being made of a resiliently compressible material; a pair of substantially identical lenses arranged back-to-back, each lens being formed to provide a light-transmitting wall and a peripheral flange extending axially away from said combination light-transmitting wall, the free edge surface portion of each of said flanges being in abutting engagement with a respective opposite side of said combination light reflector and gasket member, said combination light reflector and gasket member dividing the interior space defined by said lenses into two lamp compartments, each of said lens flanges having a semi-circular recess formed therein axially registering with the recess formed in the other lens flange, each of said recesses being defined by a semi-cylindrical surface having a substantially U-shaped semi-circular groove formed therein; a lamp supporting member having a cylindrical lamp bulb socket disposed within both of said lamp compartments adapted to receive a single lamp bulb for illuminating both lamp compartments, said cylindrical lamp bulb socket being embraced by said semi-cylindrical surfaces and having a radially extending flange formed thereon intermediate its ends disposed within said semi-circular grooves; fastening means for firmly pressing the free edge surface portion of each of said flanges into abutting engagement with said combination light-reflector and gasket member and for clamping said cylindrical lamp bulb socket between said semi-cylindrical surfaces; and a split opaque band substantially encircling and secured to said lens flanges, said split band being disposed on the outermost surfaces of said lens flanges and covering the joints between said free edge surface portions of said lens flanges and said combination light reflector and gasket member.

14. An automotive vehicle signal lamp construction as set forth in claim 13, wherein said lamp supporting member has an externally threaded nipple projecting exteriorly of said lenses adapted to be secured to a vehicle part so as to support the vehicle signal lamp on a vehicle.

15. An automotive signal vehicle lamp construction comprising, in combination, a substantially flat, plate-like combination light reflector and gasket member; a pair of substantially identical lenses arranged back-to-back, each lens being formed to provide a light-transmitting wall and a peripheral flange extending axially away from said light-transmitting wall, the radially outermost surface of each of said flanges being radially spaced inwardly from the outermost marginal edge of a respective light-transmitting wall whereby a peripheral shoulder is formed at the juncture of said flange outermost surface and light-transmitting wall, the free edge surface portion of each of said flanges being in abutting engagement with a respective opposite side of said combination light reflector and gasket member, said combination light reflector and gasket member dividing the interior space defined by said lenses into two lamp compartments, the radially outermost surfaces of said flanges and said shoulders defining an annular pocket, each of said lens flanges having a semi-circular recess formed therein axially registering with the recess formed in the other lens flange, each of said recesses being defined by a semi-cylindrical surface having a substantially U-shaped semi-circular groove formed therein; a lamp supporting member having a cylindrical lamp bulb socket disposed within both of said lamp compartments adapted to receive a single lamp bulb for illuminating both lamp compartments, said cylindrical lamp bulb socket being embraced by said semi-cylindrical surfaces and having a radially extending flange formed thereon intermediate its ends disposed within said semi-circular grooves; fastening means for firmly pressing and securing the free edge surface portion of each of said flanges into abutting engagement with said combination light reflector and gasket member and for clamping said cylindrical lamp bulb socket between said semi-cylindrical surfaces; and a split metallic opaque band substantially encircling and secured to said lens flanges, said split band being disposed in said annular pocket and extending axially between said shoulders partially defining said pocket.

16. An automotive vehicle signal lamp construction as set forth in claim 15, wherein said cylindrical lamp bulb socket of said lamp supporting member has an externally threaded nipple integrally formed therewith, said nipple projecting exteriorly of said lenses when said lenses are in their assembled relationship and adapted to be secured to a vehicle part so as to support the vehicle signal lamp on a vehicle.

References Cited by the Examiner

UNITED STATES PATENTS

| Re. 16,254 | 1/1926 | Leech et al. | 240—8.22 |
| 2,446,455 | 8/1948 | Bowman | 240—100 X |
| 2,578,284 | 12/1951 | Bowman | 240—7.1 X |
| 2,738,414 | 3/1956 | Davis et al. | 240—8.22 |
| 2,739,224 | 3/1956 | Knapp | 240—8.22 |
| 2,806,937 | 9/1957 | Hollins | 240—8.22 |
| 2,880,306 | 3/1959 | Witte | 240—10.65 |
| 2,991,899 | 7/1961 | Montalbano | 240—8.22 X |
| 3,180,979 | 4/1965 | Thurston | 240—11.2 X |

NORTON ANSHER, *Primary Examiner.*